(12) United States Patent
Barber et al.

(10) Patent No.: US 9,075,132 B2
(45) Date of Patent: Jul. 7, 2015

(54) DEVELOPMENT OF A CONTRAST PHANTOM FOR ACTIVE MILLIMETER WAVE IMAGING SYSTEMS

(75) Inventors: Jeffrey B. Barber, Vineland, NJ (US); James C. Weatherall, Linwood, NJ (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 14/008,800

(22) PCT Filed: Mar. 29, 2012

(86) PCT No.: PCT/US2012/031178
§ 371 (c)(1),
(2), (4) Date: Oct. 4, 2013

(87) PCT Pub. No.: WO2012/135477
PCT Pub. Date: Oct. 4, 2012

(65) Prior Publication Data
US 2014/0014829 A1    Jan. 16, 2014

Related U.S. Application Data (60) Provisional application No. 61/468,779, filed on Mar. 29, 2011.

(51) Int. Cl.
| | |
|---|---|
| *G01S 7/497* | (2006.01) |
| *G01S 7/40* | (2006.01) |
| *G01S 7/41* | (2006.01) |
| *G01S 13/88* | (2006.01) |

(52) U.S. Cl.
CPC . *G01S 7/497* (2013.01); *G01S 7/40* (2013.01); *G01S 7/4052* (2013.01); *G01S 7/411* (2013.01); *G01S 13/887* (2013.01); *G01S 2007/4082* (2013.01)

(58) Field of Classification Search
CPC ........................................................ G01S 7/497
USPC .......................................... 250/252.1, 505.1
See application file for complete search history.

(56) References Cited

PUBLICATIONS

Akhtar et al., "*An Experimental Setup for the Microwave Imaging of Inhomogeneous Dielectric Bodies*", Antennas and Propagation Society Symposium, vol. 1, pp. 225-228, 2004.
Bao et al., "*Microwave Dielectric Characterization of Binary Mixtures of Water, Methanol and Ethanol*", Journal of Chemical Physics, vol. 104, No. 12, pp. 4441-4450, 1996.
Barber et al., "*Millimeter Wave Measurements of Explosives and Simulants*", Proceedings of SPIE, vol. 7670, pp. 1-7, 2010.
Blackham et al., "*An Improved Technique for Permittivity Measurements Using a Coaxial Probe*", IEEE Transactions on Microwave Theory and Techniques, vol. 46, No. 5, pp. 1093-1099, 1997.

(Continued)

*Primary Examiner* — David Porta
*Assistant Examiner* — Faye Boosalis
(74) *Attorney, Agent, or Firm* — Diederiks & Whitelaw, PLC (57) ABSTRACT

A contrast phantom for an active millimeter wave imaging system is made from different materials or sections having different reflectivities. The reflectivities incrementally increase in discrete steps so that the phantom is useable to calibrate the active millimeter wave imaging system. The reflectivities preferably range from 0% to 100% and incrementally and linearly increase in equal steps. A method of producing the contrast phantom for the active millimeter wave imaging system is also described.

21 Claims, 7 Drawing Sheets

(56) References Cited

PUBLICATIONS

Bressan et al., "Simultaneous Lightness Contrast on Plain and Articulated Surrounds", Perception, vol. 35, vol. 4, pp. 445-452, 2006.

Buff et al., "Cole-Cole Dispersion Models for Aqueous Gelatin-Syrup Dielectric Composites", IEEE Transactions on Geoscience and Remote Sensing, vol. 44, No. 2, pp. 351-355, 2006.

Buff et al, "Design of a Microwave Dielectric Surrogate for Soil Using Aqueous Gelatin-Syrup Solutions", Microwave Conference, 2005.

Cetinkaya et al., "The Millimeter-Wave Imaging of Concealed Objects", Antennas and Propagation, pp. 228-231, 2011.

Fellers, "Measurements in the Millimeter to Micron Range", Proceedings of the IEEE, vol. 55, No. 6, pp. 1003-1015, 1967.

Friedsam et al., "Precision Free-Space Measurements of Complex Permittivity of Polymers in the W-Band", IEEE Microwave Symposium Digest, vol. 3, pp. 1351-1354, 1997.

Meissner et al, "The Complex Dielectric Constant of Pure and Sea Water From Microwave Satellite Observations", IEEE Transactions on Geoscience and Remote Sensing, vol. 42, No. 9, pp. 1836-1849, 2004.

Meriakri et al., "Materials for Application in Millimeter and Submillimeter Ranges", International Microwave and Optoelectronics Conference, vol. 2, pp. 532-534, 1999.

Nelson, "Density-Permittivity Relationships for Powdered and Granular Materials", IEEE Transactions on Instrumentation and Measurement, vol. 50, No. 5, pp. 2033-2040, 2005.

Nelson, "Measurement and Calculation of Powdered Mixture Permittivities", IEEE Transactions on Instrumentation and Measurement, vol. 50, No. 5, pp. 1066-1070, 2001.

Nelson et al., "Open-Ended Coaxial-Line Permittivity Measurements on Pulverized Materials", IEEE Transactions on Instrumentation and Measurement, vol. 47, No. 1, pp. 133-137, 1998.

Nelson et al., "Relationships Between Microwave Permittivities of Solid and Pulverised Plastics", Journal of Physics D: Applied Physics, vol. 23, pp. 346-353, 1990.

Shimabukuro et al., "A Quasi-Optical Method for Measuring the Complex Permittivity of Materials", IEEE Transactions on Microwave Theory and Techniques, vol. 32, No. 7, pp. 659-665, 1984.

Simonis et al., "Characterization of Near-Millimeter Wave Materials by Means of Non-Dispersive Fourier Transform Spectroscopy", International Journal of Infrared and Millimeter Waves, vol. 5, No. 1, pp. 57-72, 1983.

Sobel et al, "Quasi-Optical Surface Waveguide and Other Components for the 100- to 300-Gc Region", IRE Transactions on Microwave Theory and Techniques, vol. 9, No. 6, pp. 512-518, 1961.

DEVELOPMENT OF A CONTRAST PHANTOM FOR ACTIVE MILLIMETER WAVE IMAGING SYSTEMS

CROSS REFERENCE TO RELATED APPLICATIONS

The present application represents a National Stage application of PCT/US2012/031178, filed Mar. 29, 2012, entitled "Development of a Contrast Phantom for Active Millimeter Wave Imaging Systems", which claims the benefit of U.S. Provisional Patent Application Ser. No. 61/468,779, filed Mar. 29, 2011, entitled "Development of a Contrast Phantom for Active Millimeter Wave Imaging Systems", the entire contents of these applications are incorporated herein by reference.

BACKGROUND OF THE INVENTION

Figure 1:
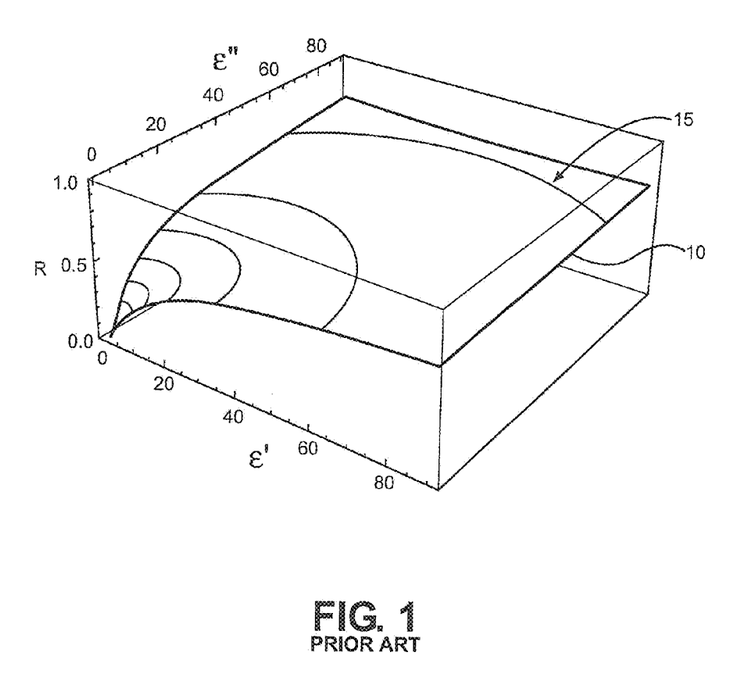
FIG. 1 is a plot of Reflectivity R at the air/surface boundary of a material with a complex dielectric constant.

The present invention pertains to the art of contrast phantoms used to calibrate active millimeter wave imaging systems. Millimeter wave imaging is employed in personnel screening systems to detect concealed explosives and weapons. In order to benchmark performance of an active millimeter wave system, it is desirable to have a phantom that contains materials that reflect incoming radiation such that an analysis can be performed on the system to verify results. The intensity of millimeter radiation observed from illumination of a target material depends on the values of the real and imaginary components of the complex dielectric constant, and the target material's geometric thickness. This has been described in "Millimeter Wave Measurements of Explosives and Simulants" by Barber, et al. in Proc. of SPIE Vol. 7670, 76700E, incorporated herein by reference. Briefly, the intensity returned from a material is $$I = \left[R_F + \frac{(1-R_F)^2}{1-R_F R_R \exp(-2KL)} R_R \exp(-2KL)\right] * I_0 \quad (1)$$

where $R_F$ is the front surface reflection, $R_R$ the rear surface the reflection, L is the length of the material, and K is the attenuation in the material. The front and rear surface reflections are functions of the dielectric constant of the material itself and the materials at the interfaces. Using air as the surrounding material, it is possible to plot the reflectivity of an arbitrary material of infinite thickness as a function of real and imaginary dielectric constant ($\in'$ and $\in''$), yielding a plot 10 as illustrated in FIG. 1 showing Reflectivity R at the air/surface boundary of a material of complex dielectric constant e. Contours 15 of constant R range from 0.1 to 0.7. This demonstrates that for a reflectivity of interest, there is an ellipsoid of solutions for combinations of real and imaginary dielectric values which will yield that particular reflectivity from a material. It is only necessary to tailor the material to match one point on the ellipsoid of solutions.

The propagation of electromagnetic plane waves is well understood. Consider a plane was propagating through free space where the amplitude of the electric field is $E_0$. The dielectric constant of free space (vacuum) is defined as 1−i0, where air can be substituted for vacuum to a first approximation. As the plane wave meets a boundary of a medium at normal incidence, the plane wave is both reflected and transmitted. The amplitude of the reflected and transmitted waves are defined as $$E_r = rE_0, \quad (2)$$

$$E_t = tE_0 \quad (3)$$

where r and t are the reflection and transmission coefficients.

$$r = \left|\frac{1-\sqrt{\varepsilon_{matl}}}{1+\sqrt{\varepsilon_{matl}}}\right| \quad (4)$$

$$t = (1-r). \quad (5)$$

Note that r and t are related to the electric field, and are to be distinguished from reflectance R and transmittance T, defined as $$R = |r|^2 \quad (6)$$

$$T = |t|^2 \quad (7)$$

which are related to intensity (the square of the electric field). The complex dielectric constant (relative permittivity) of a material is defined as:

$$\in_{matl} = \in_{matl}' - i\in_{matl}'' \quad (8)$$

where $\in'$ and $\in''$ are the real and imaginary portions of the complex dielectric constant. The dielectric constant of a material is a frequency-dependent quantity and describes how a material responds to electromagnetic waves. The dielectric constant can be used interchangeably with complex index of refraction as they are related quantities.

A detailed derivation of the reflected and transmitted waves for a plane wave normally incident on a plane-parallel slab of arbitrary material with particles much smaller than the wavelength of the radiation has been described in "Absorption and Scattering of Light by Small Particles" Wiley-VCH Weinheim (2004), incorporated herein by reference. The reflected wave can be derived by considering the dielectric constants of the slab and the surrounding material. For a slab of material of thickness L in air, the reflection coefficient of the slab is given by:

$$r_{slab} = \left|\frac{r\left[1-\exp\left(i\frac{4\pi}{\lambda}L\sqrt{\varepsilon_{slab}}\right)\right]}{1-r^2\exp\left(i\frac{4\pi}{\lambda}L\sqrt{\varepsilon_{slab}}\right)}\right| \quad (9)$$

where λ is the wavelength of the incoming radiation. For an imaging portal operating over a narrow band of frequencies, the signal returned is determined by the thickness of the material and the dielectric constant. Thus, in order to simulate the reflected signal expected from a slab of explosives, it is necessary to match the complex dielectric constant of the explosive with a different material to be used as the simulant. In doing so, one can then configure the simulant identically to an explosive and expect the same return. Note that $r_{slab} \to r$ when the term in the exponential becomes large through some combination of increasing thickness or complex dielectric constant of the slab. As such, for opaque materials, there is an ellipsoid of solutions for the complex dielectric constant that will produce a desired reflectivity. This greatly simplifies the process of creating simulants, as it is only necessary to find a material whose complex dielectric constant falls on this ellipsoid.

The theory of mixing component materials with regard to dielectric constant is fairly well developed. The Landau & Lifshitz, Looyenga equation, or $$(\in_{mixture})^{1/3} = v_1(\in_1)^{1/3} + v_2(\in_2)^{1/3} \quad (10)$$

provides a good approximation for determining the dielectric constant of a mixture from those of the mixture's individual component materials. Here, e is the complex dielectric constant and u is the volume fraction of the component material. This has been used as a starting point for creating millimeter wave simulants. Once the dielectric constant of a base has been identified and measured, adjustments to the base material can be made by doping with materials with different dielectric, constants to change both the real and imaginary portions of the formulation. When coupled with the thickness of the material, Equation (10) can be used to create a material of any reflectivity.

As the development of active millimeter wave imaging systems continues, it is necessary to validate materials that simulate the expected response of explosives. Further, while physics-based models have been used to develop simulants, there exists a need in the art to image both the explosive and simulant together in a controlled fashion and in order to benchmark performance of an active millimeter wave system, and there exists a need to have a contrast phantom containing materials that reflect incoming radiation and allow an analysis to be performed to verify the results generated by an active millimeter wave imaging system are correct.

SUMMARY OF THE INVENTION

The present invention is directed to a contrast phantom for an active millimeter wave imaging system. The contrast phantom is made from different sections having different reflectivities. The reflectivities incrementally increase in discrete steps so that the phantom is useable to calibrate the active millimeter wave imaging system. The reflectivities preferably range from 0% to 100% and incrementally and linearly increase in equal steps. Air is used to achieve a 0% reflectivity, while a reflective material such as metal is use to obtain 100% reflectivity. In another embodiment, a container that is transparent to millimeter waves is used to contain least one the materials including a liquid with a first dielectric constant and a liquid with a second dielectric constant in relative amounts selected to set a desired reflectivity. In yet another embodiment the relative distance that reflected millimeter waves travel through semi-transparent material changes in each section to change the reflectivity of each section. Preferably the materials are non-flammable and non-toxic.

The invention is also directed to a method of producing a contrast phantom for an active millimeter wave imaging system. The method includes selecting a first material with a first reflectivity; selecting a second material with a second reflectivity; selecting a third material with a third reflectivity; and arranging the first, second and third materials in a housing so that the reflectivities incrementally increase in discrete steps whereby a phantom is useable to calibrate the active millimeter wave imaging system. The method also includes arranging the first, second and third materials in a housing so that the reflectivities range from 0% to 100% and incrementally and linearly increase in equal steps. In another embodiment, the method includes filling a container that is transparent to millimeter waves with at least one of the first, second and third materials that includes a liquid with a first dielectric constant and a liquid with a second dielectric constant, and adjusting the relative amounts of the liquid with the first dielectric constant and the liquid with the second dielectric constant to set a desired reflectivity of the at least one of the first, second and third materials.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF THE PREFERRED EMBODIMENTS OF THE INVENTION

Figure 2A:
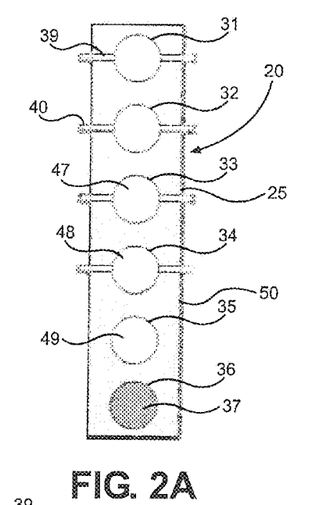
FIG. 2A is an isometric view of a contrast phantom made in accordance with a preferred embodiment of the invention.
Figure 2B:
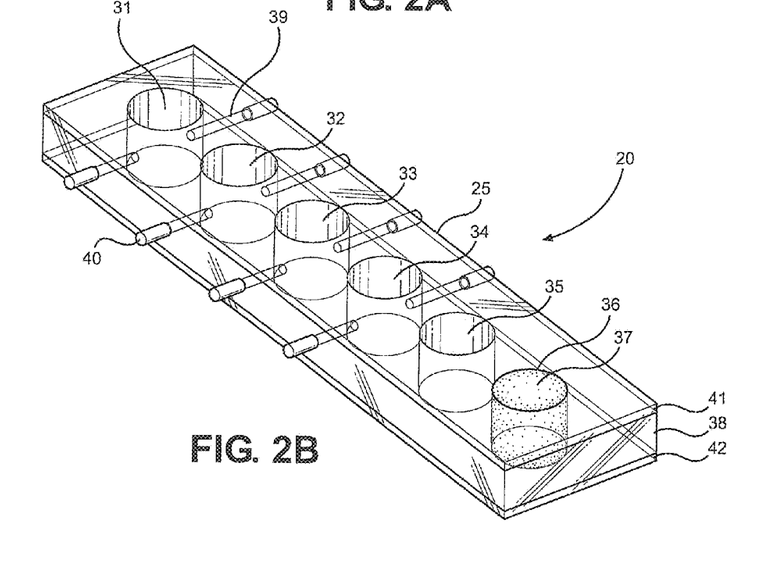
FIG. 2B is a top view of the contrast phantom of FIG. 2A.

With initial reference to FIGS. 2A and 2B, there is shown a reflectivity contrast phantom 20. Phantom 20 is constructed for containing liquid explosives/precursor and liquid simulants. As shown, phantom 20 has a housing 25 with several sections or wells 31-36 preferably located in a linear fashion. The wells 31-36 are filled with first through sixth materials having first through sixth reflectivities. As shown in FIG. 2A wells 31-34 are preferably filled with a liquid explosive/precursor of interest, a candidate simulant, and two reflectivity standards, respectively. Well 35 is empty, and well 36 contains aluminum 37. Phantom 20 is preferably manufactured from 0.5 in. thick sheets of Rexolite 1422 (C-Lee Plastics Inc.). Rexolite is a cross-linked polystyrene material that has been shown to have a stable dielectric constant up to 500 GHz. Sheet Rexolite, not shown, is cut into 24 in.×5 in. rectangular sheets. One sheet 38 is shown in FIG. 2A, Six 3 in. diameter wells 31-36 are bored through sheet 38. Channels 39 are cut into the sides of phantom 20 for wells 31-36, and perfluoroalkoxy (PFA) polymer pipefittings 40 are used to seal channels 39. A disk of aluminum 37 is inserted into well 36, and well 35 is purposely left empty such that it only contains air. Thin Rexolite sheets 41, 42, (0.010 in., 0.025 cm in thickness), are used to cover the surfaces of sheet 38 in order to minimize absorption and interference effects from coherent radiation on the order of 1 cm in wavelength. Thin sheets 41, 42 are glued to front and back surfaces of phantom housing 25 to create a complete seal around wells 31-36. Aluminum 37 in well 36 of phantom 20 acts like a mirror to millimeter waves, thus having a reflection coefficient assumed to be unity. Air in well 35 has a reflection coefficient of zero. Corn syrup 47 and water 48 were chosen as additional reflection standards due to their dielectric properties and citation in the open literature. These are placed into wells 33 and 34, respectively as can best be seen in FIGS. 3A-3D. Previous dielectric measurements via a coaxial probe are used to establish reflection coefficients of 0.47 for corn syrup and 0.77 for water. The use of multiple materials with a range of relative permittivity allowed for the establishment of a grayscale calibration curve such as those shown in FIG. 4 for the images in FIGS. 3A-3D and discussed further below.

Commercial MMW imaging systems provide only a black-and-white image. In order to control the imaging scenario and remove as many variables as possible, contrast phantom 20 has been designed to control the configuration of samples while minimizing interference from phantom 20 itself. Additionally, phantom 20 is designed to contain materials that are considered as "standards" in order to give calibration points to the image. With samples in the same image as standards, the image grayscale is calibrated in order to verify the accuracy of the calculated signal return while enabling a simple grayscale comparison of simulant to explosive to determine a match. The image grayscale scales linearly with reflection coefficient if electric field magnitude is utilized by an imaging system. Those systems that utilize intensity will produce an image that scale linearly with reflectance, or the square of reflection coefficient per Equation (6).

The method used for creating MMW simulants has been described previously in the background. Briefly, the Landau & Lifshitz, Looyenga equation, or $$\in_{mixture}^{1/3} = \Sigma_j v_j \in_j^{1/3} \tag{11}$$

is a good approximation to determining the dielectric constant of mixtures from those of its individual components. Here, $\in_j$ is the complex dielectric constant and $v_j$ is the volume fraction of the $j^{-th}$ component. This has been used as a starting point for creating millimeter wave simulants. Once the dielectric constant of an explosive has been determined, a base material with similar dielectric properties is identified and measured. Adjustments to the base material are made by doping with materials with different dielectric constants to change both the real and imaginary portions of the simulant.

Figure 3A:
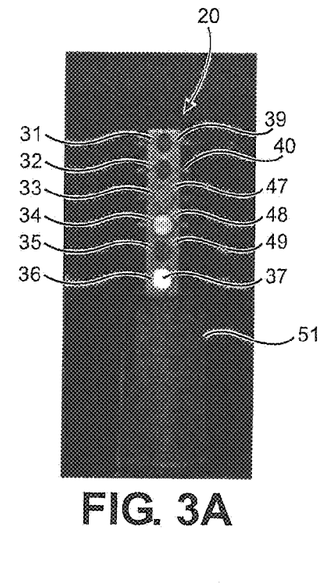
FIGS. 3A-D show four images collected of a sample contrast phantom using different supports.
Figure 3B:
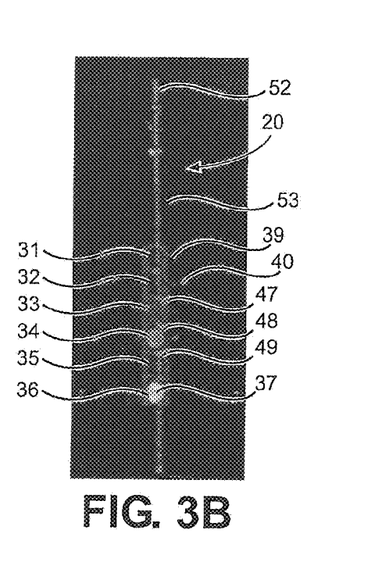
Figure 3C:
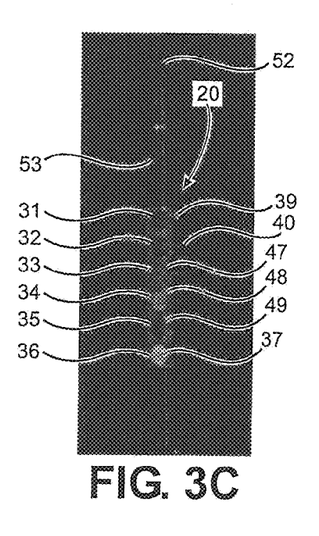
Figure 3D:
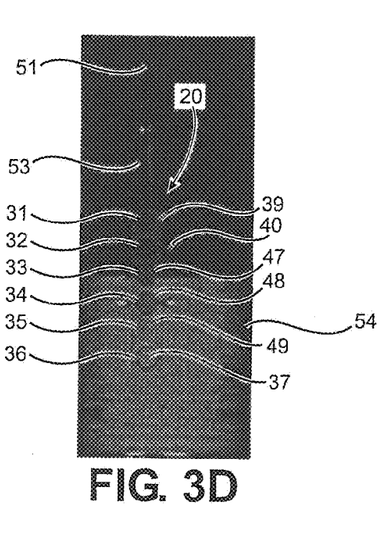

By way of example, reference will be made to data collected during a representative experiment wherein millimeter wave images were collected using a commercially-available active millimeter-wave imaging system. The images, shown in FIGS. 3A-3D, were saved using the system software in a proprietary data format and later converted to a bitmap file format. Image J, a software program, was then used to obtain histograms and statistics on the grayscale values contained in the regions of the image corresponding to the reflectivity standards, explosive and simulant. FIGS. 3A-3D display four separate images that were collected of phantom 20 using various methods of support, with other objects in each image, and at different distances from the imaging array. More specifically, FIG. 3A shows phantom 20 self-supported on a rectangular plastic stand 51 close to the array. FIG. 3B shows phantom 20 hung from a pole 52 using twine 53 and a screw clamp (not separately labeled) close to the array. FIG. 3C show phantom 20 supported by pole 52 that has been relocated approximately one foot backwards. Finally, FIG. 3D is the same configuration as FIG. 3C with a steel sheet 54 inserted behind a lower portion of phantom 20. Phantom 20 can be seen to have six distinct wells, i.e., wells 31 and 32 are empty, followed by corn syrup 47, water 48, air 49 and aluminum 37 in wells 33-36, respectively. Note that support pole 51 and steel sheet 54 are not visible through corn syrup 47 and water 48, indicating that these materials are opaque in this configuration.

An analysis of the images in FIGS. 3A-3D was performed using an 8-bit grayscale, with black as value 0 and white as value 255. The imaging system used assigned the point of highest electric field to white, then scaled the rest of the image accordingly. The section of FIG. 3A corresponding to aluminum 37 contains the white point in the image, leading to its mostly white appearance. For FIGS. 3B and 3C, the white point in the image is found to be from a plastic-covered screw on the mounting stand. FIG. 3D is particularly striking, as both aluminum 46 and steel 54 are gray, while plastic pipe fittings 40, which are essentially transparent at these frequencies, are now bright white.

As the materials in phantom 20 are the same from image to image, there will be no change in their respective reflection coefficients. If the millimeter wave source in the imaging system were incoherent, any metal in the image would be expected to appear white, as metal acts as a mirror. If the imaging system contains a narrow-band coherent source, it is possible to have constructive interference leading to electric fields that are higher than one would expect from the simple incoherent model. Metals, as well as opaque materials, will appear identical under both coherent and incoherent illumination, but interference bands may be observed in transparent materials. Despite changes in the absolute grayscale of phantom 20 from image to image due to constructive interference, the relative grayscale of the standard materials in phantom 20 (metal, water, corn syrup) is controlled solely by the dielectric constant of the materials themselves.

Figure 4:
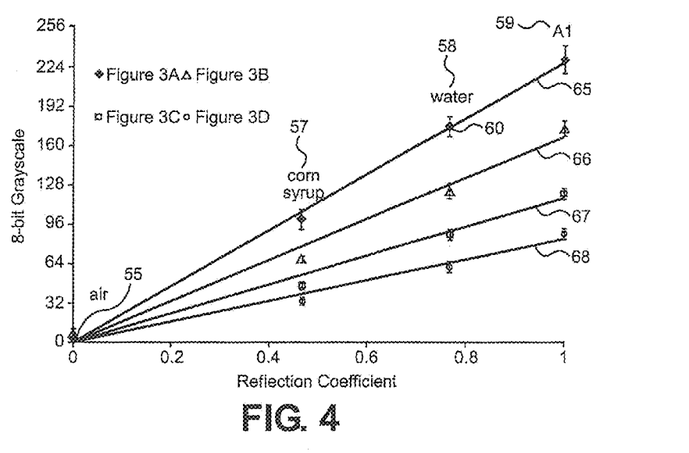
FIG. 4 is a graph of Reflection Coefficient versus 8-bit grayscale of the mean grayscales of air, corn syrup, water, and aluminum in the sample contrast phantoms of FIGS. 3A-D.
Figure 5:
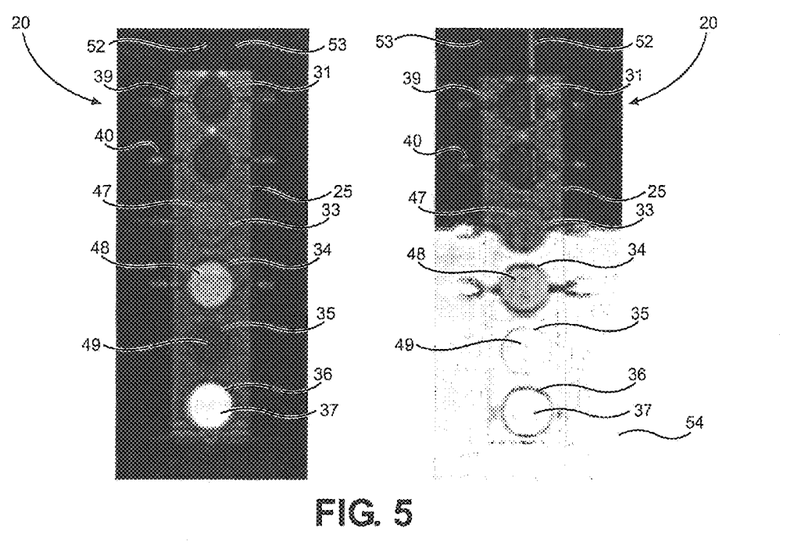
FIG. 5 is a close-up of the phantom shown FIG. 3A alongside a close-up of a normalized phantom of FIG. 3D.
Figure 6:
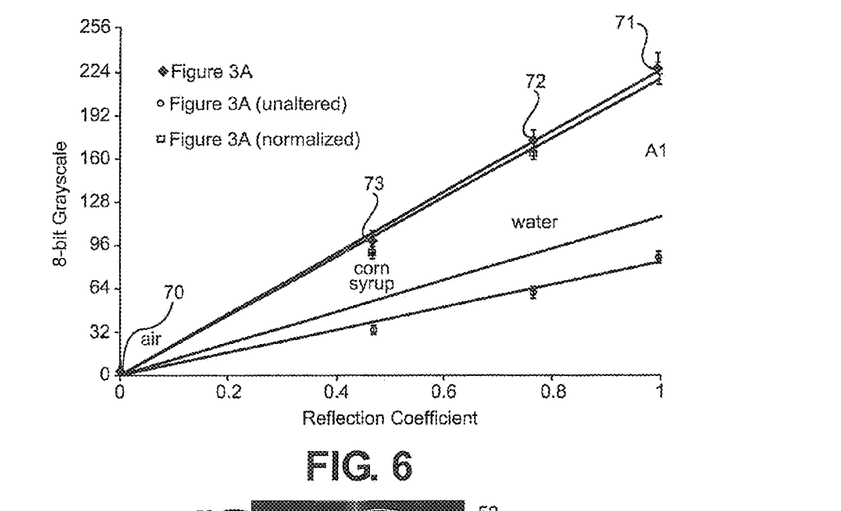
FIG. 6 is a graph of Reflection Coefficient versus 8-bit grayscale of the mean grayscales of air, corn syrup, water, and aluminum in the sample contrast phantoms of FIGS. 3A, 3D and a normalized phantom of FIG. 3D.

FIG. 4 shows the mean grayscale for 398 pixels within the areas of the images in FIGS. 3A-D associated with air 55, corn syrup 57, water 58 and aluminum 59. The grayscale of air 55 was determined by using a similar sized area of the image that contains no objects. Error bars 60 represent one standard deviation of the grayscale. Linear regression lines 65-68 have been added to show that the grayscale scales linearly with reflection coefficient, indicating that the image grayscale is a display of the magnitude of the returned electric field. If the imaging system used in this study generated grayscale based upon intensity, this would result in curves that would be second-order with respect to reflection coefficient. This linear relationship allows images to be normalized in order to place them on a consistent basis. The left side of FIG. 4 contains the image from FIG. 3A unaltered, alongside a normalized image from FIG. 3D positioned on the right side of FIG. 4. Normalization has caused the mean grayscale values for the areas containing air, aluminum, water and corn syrup to match within the standard deviations of their respective areas as shown at 70-73 in FIG. 6. This process was performed within the Image J software by rescaling all grayscale values 94 to 255. While water 48 appears visually different when comparing the left side and right side images in FIG. 5, they are indeed the same grayscale. This is an example of an optical illusion called simultaneous lightness contrast, showing that optical illusions should be considered when performing image analysis via human perception.

Figure 7:
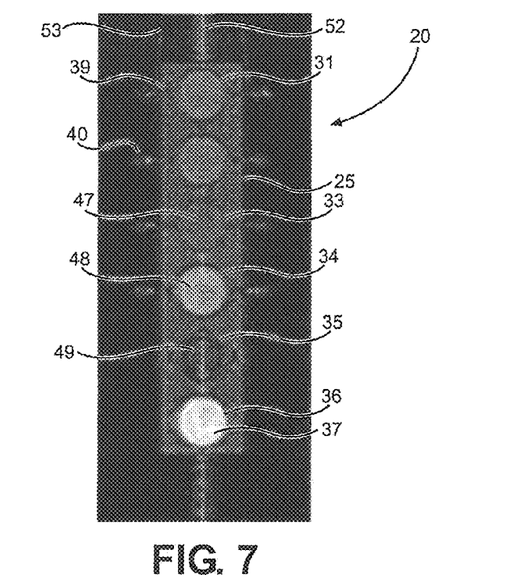
FIG. 7 is a close-up image of a contrast phantom filled with a liquid simulant and a liquid explosive precursor.
Figure 8:
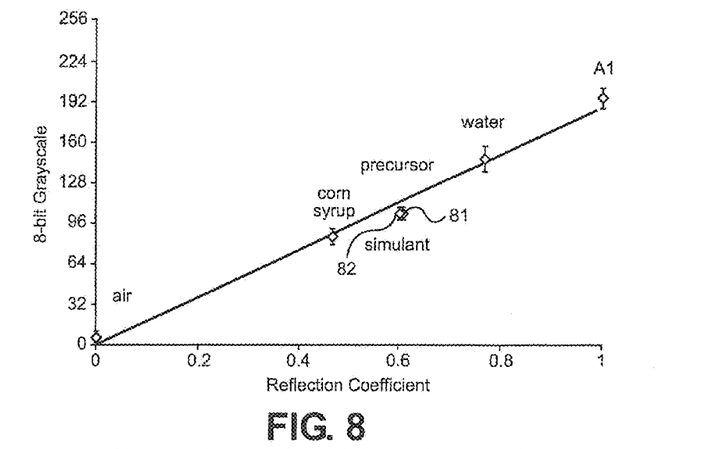
FIG. 8 is a graph of Reflection Coefficient versus 8-bit grayscale of the mean grayscales of air, corn syrup, water, and aluminum in the sample contrast phantom in FIG. 7.

FIG. 7 is a close-up image of contrast phantom 20 filled with a liquid precursor and its candidate simulant. The results of an analysis of the grayscales of phantom wells 31-36 are listed in Table 1, and FIG. 8 is a plot of the mean grayscales of the phantom materials fit with a linear regression. Reflection coefficients are calculated from permittivity values using Equation (4). The mean grayscales of the simulant 81 and precursor 82 are well within their respective standard deviations, indicating that, for opaque samples, these two materials will appear the same to the commercial system used in this study. As the reflection coefficient has been matched here, and not the complex permittivity, it should be noted that for thin, semi-transparent samples, this simulant 81 may not be a suitable match for this liquid precursor. The liquid simulant is a non-flammable, non-toxic solution, allowing for the safe testing of the imaging system used in this work by human subjects.

TABLE 1

Results of grayscale analysis on FIG. 8. Results for air were obtained from a representative section of the background. Reflection coefficients are calculated from permittivity measurements using Eqn. (4).

|  | metal | water | corn syrup | precursor | simulant | air |
|---|---|---|---|---|---|---|
| Refl. Coeff. | 1.00 | 0.77 | 0.47 | 0.60 | 0.60 | 0.00 |
| Pixel count | 398 | 398 | 398 | 398 | 398 | 398 |
| Mean grayscale | 195.0 | 147.1 | 85.9 | 103.1 | 104.4 | 7.0 |
| Std. dev. | 8.2 | 9.5 | 5.9 | 5.0 | 4.6 | 2.0 |

Figure 9:
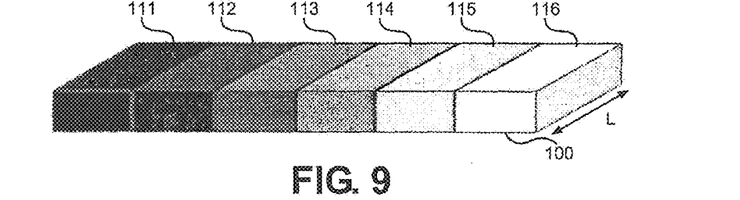
FIG. 9 is an isometric view of a planar reflectivity contrast phantom having reflectivities range from 0-100% from left to right in 20% increments.
Figure 10:
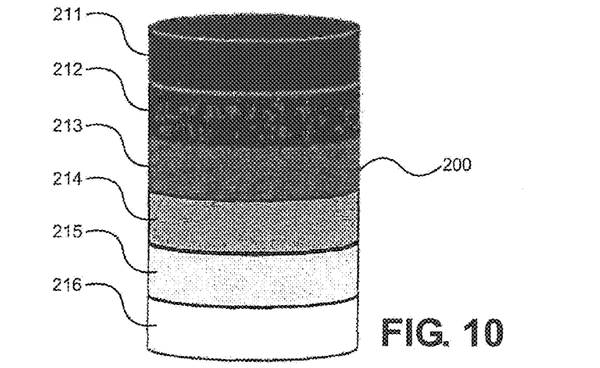
FIG. 10 is an isometric view of a cylindrical reflectivity contrast phantom having reflectivities range from 0-100% from top to bottom in 20% increments.

In terms of configuring phantom 20 for a millimeter wave system, current millimeter wave scanners are generally either planar or cylindrical in nature. For a planar system, it is preferable that a contrast phantom 100 be planar, as depicted in FIG. 9 showing six different sections 111-116 having materials of varying reflectivities. Preferably a material with a metallic surface is used to create the 100% reflector, such as by utilizing a metal foil or metallic paint covering another material such as plastic. Alternatively the entire 100% reflector can be metal. A piece of radar absorbing material is used to create a 0% reflector. Materials in between are selected based upon their dielectric constants. These could either be one or more solid materials in combination, or liquid materials stored in a container made of a material that is transparent to millimeter waves, such as low density polyethylene. The relative amounts of each liquid or solid material are adjusted to set a desired reflectivity. The dielectric constant of the material inside a container is adjusted to remove effects from the container itself, if necessary. A similar cylindrical phantom 200 for a cylindrical system is depicted in FIG. 10 also made of six different sections 211-216 having materials of varying reflectivities. It is possible to create phantoms with any range and in any increment desirable using this method. One only need select the appropriate materials. Preferably, the materials in each section 211-216 range from 0% to 100% and incrementally and linearly increase in equal steps.

Figure 11:
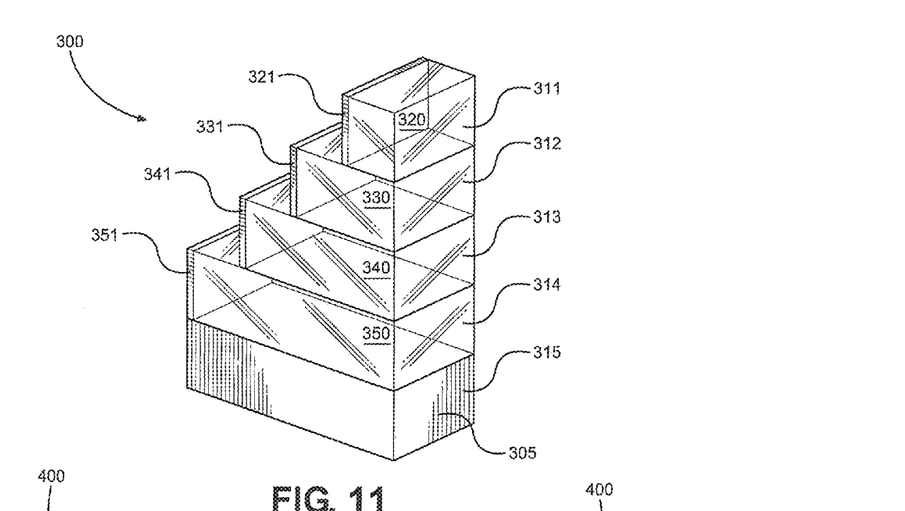
FIG. 11 is an isometric view of a contrast phantom having separate sections with different reflectivities wherein each section has a different thickness of semi-transparent material with reflective backing.

FIG. 11 shows a contrast phantom 300 with a planar front side 305 having five different sections 311-315. First section 311 is formed of a semi-transparent portion 320 made of a first material that is semi-transparent to millimeter wave electromagnetic radiation and has a metal backing 321. Second section 312 is also formed of a semi-transparent portion 330, made of a second material that is semi-transparent to millimeter wave electromagnetic radiation and is thicker than semi-transparent portion 320, and a has metal backing 331. Likewise third and fourth sections 313, 314 have respective semitransparent and metal portions 340, 341; 350, 351. Fifth section 315 is preferably a reflector and is either all metal or has a metal outer surface. With this arrangement each section 311-314 has progressively less reflectivity since the millimeter waves have to travel progressively longer distances though semi-transparent sections 311-314, which are all preferably made from the same semi-transparent material. While metal section 315 is shown next to section 314, metal section 315 may also be placed next to section 311 so that phantom 300 has sections that range from 0% to 100% and incrementally and linearly increase in equal steps.

Figure 12:
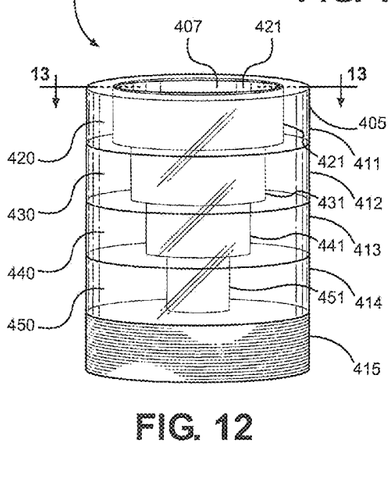
FIG. 12 is an isometric view of a cylindrical contrast phantom having separate sections with different reflectivities wherein each section has a different thickness of semitransparent material with reflective backing.
Figure 13:
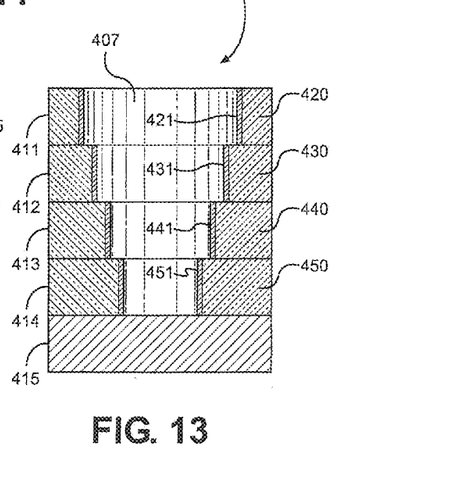
FIG. 13 is a cross-sectional view of the contrast phantom taken along the line 13-13 of FIG. 12.

FIGS. 12 and 13 show a contrast phantom 400 with a cylindrical outer surface 405 and a stepped central hole 407, in a manner analogous to contrast phantom 300, contrast phantom 400 has different sections 411-415. First section 411 is formed of a semi-transparent portion 420 and has a metal backing 421. Second section 412 is also formed of a semi-transparent portion 430 that is thicker than semi-transparent portion 420 and has a metal backing 431. Likewise third and fourth sections 413, 414 have respective semi-transparent and metal portions 440, 441; 450, 451. Fifth section 415 is preferably a reflector and is either all metal or has a metal outer surface. With this arrangement, each section 411-414 has progressively less reflectivity since the millimeter waves have to travel progressively longer distances though semi-transparent sections 411-414, which are all preferably made from the same semi-transparent material. While metal section 415 is shown next to section 414, metal section 415 may also be placed next to section 411 so that phantom 400 would have sections that range from 0% to 100% and incrementally and linearly increase in equal steps. As shown, the size of each section 420, 430, 440, 450 and associated metal backing 421, 431, 441, 451 varies in the radial direction such that the size of each section varies from small to large moving from the bottom to the top of FIG. 13 and therefore phantom 400 may be used to verify the resolution of the active millimeter wave system. The size of each section 420, 430, 440, 450 may also vary in height, again from small to large, to verify the resolution of the active millimeter wave system. Preferably the size of each section is on the order of 10 cm to avoid diffraction artifacts; however the sizes may be as small as 1 cm or even on the order of one wavelength.

Based on the above, it should be readily apparent that the present invention advantageously provides a reflectivity-based contrast phantom for active millimeter wave imaging systems. The phantom is designed with plastic, metal, and liquid components that have known dielectric properties in order to control their respective reflection coefficients. Image collection indicates that the imaging system displays the image grayscale as a function of the magnitude of the electric field. While image artifacts from constructive interference in thin materials can skew the overall grayscale, the grayscale of the materials in the phantom maintain a linear relationship. Using the known reflection coefficients of these materials, the grayscale of separate images are normalized to one another. A non-flammable, non-toxic simulant material has been developed to match the reflection coefficient of a liquid explosive precursor, which has been successfully validated for an imaging system. A phantom containing the simulant material can be used to calibrate active millimeter imaging systems used at various security screening centers such as airports. Although described with reference to preferred embodiments, it should be readily apparent that changes and/or modifications can be made to the invention without departing from the spirit thereof. For example, the size and dimensions of the sections of the phantoms shown in any of the preferred embodiments may be changed to verify the resolution of an active millimeter wave system. In general, the invention is only intended to be limited by the scope of the following claims.

The invention claimed is:

1. A contrast phantom for calibrating an active millimeter wave imaging system comprising:
   a first section with a first reflectivity;
   a second section with a second reflectivity; and
   a third section with a third reflectivity, with the first, second and third reflectivities incrementally increasing in discrete steps, when used.

2. The contrast phantom of claim 1, wherein the first section contains a first material with a desired first dielectric constant and the second section contains a second material with a desired second dielectric constant.

3. The contrast phantom of claim 1, wherein the first, second and third reflectivities range from 0% to 100% and incrementally and linearly increase in equal steps.

4. The contrast phantom of claim 3, further comprising:
   a fourth section with a fourth reflectivity; and
   a fifth section with a fifth reflectivity.

5. The contrast phantom of claim 4, wherein the first reflectivity is 0% and the fifth reflectivity is 100%.

6. The contrast phantom of claim 5, wherein the fifth section contains a metal.

7. The contrast phantom of claim 4, further comprising:
   a sixth section with a sixth reflectivity.

8. The contrast phantom of claim 1, further comprising:
   a container provided in at least one of said first, second and third sections, said container being transparent to millimeter waves and holding a liquid with a first dielectric constant and a liquid with a second dielectric constant in relative amounts selected to set a desired reflectivity of the at least one of said first, second and third sections.

9. The contrast phantom of claim 8, wherein the at least one of said first, second and third sections contains a material that is non-flammable and non-toxic.

10. The contrast phantom of claim 8, wherein the first, second and third reflectivities range from 0% to 100% and incrementally and linearly increase in equal steps.

11. The contrast phantom of claim 10, further comprising:
    a fourth section with a fourth reflectivity; and
    a fifth section with a fifth reflectivity.

12. The contrast phantom of claim 11, wherein the first reflectivity is 0% and the fifth reflectivity is 100%.

13. The contrast phantom of claim 1 wherein the first section includes a first material of a first thickness that is semi-transparent to millimeter wave electromagnetic radiation and a reflective material and the second section includes a second material that is semi-transparent to millimeter wave electromagnetic radiation of a second thickness and a reflective material.

14. The contrast phantom of claim 13 wherein the first material is the same as the second material.

15. A method of calibrating an active millimeter wave imaging system with a contrast phantom comprising:
    selecting a first material with a first reflectivity;
    selecting a second material with a second reflectivity;
    selecting a third material with a third reflectivity;
    arranging the first, second and third materials in sections so that the first, second and third reflectivities incrementally increase in discrete steps; and
    calibrating the active millimeter wave imaging system with the phantom.

16. The method according to claim 15, wherein the first, second and third materials are arranged in a housing with the first, second and third reflectivities ranging from 0% to 100% and incrementally and linearly increasing in equal steps.

17. The method according to claim 16, further comprising:
    selecting a fourth material with a fourth reflectivity; and
    selecting a fifth material with a fifth reflectivity.

18. The method according to claim 16, further comprising:
    filling a container, which is transparent to millimeter waves, with at least one of said first, second and third materials that includes a liquid with a first dielectric constant and a liquid with a second dielectric constant; and
    adjusting relative amounts of the liquid with the first dielectric constant and the liquid with the second dielectric constant to set a desired reflectivity of the at least one of said first, second and third materials.

19. The method according to claim 16, wherein selecting the first material includes selecting a candidate simulant and selecting the second material includes selecting an explosive of interest.

20. The method according to claim 19 further comprising:
    imaging the phantom with the active millimeter wave imaging system; and
    determining if the candidate simulant has the same reflectivity as the explosive of interest whereby the simulant and the explosive of interest appear the same to the active millimeter wave imaging system.

21. A method of calibrating an active millimeter wave imaging system with a contrast phantom comprising:
    selecting a first material with a first reflectivity;
    selecting a second material with a second reflectivity;
    selecting a third material with a third reflectivity;
    arranging the first, second and third materials in sections so that the first, second and third reflectivities incrementally increase in discrete steps;
    calibrating the active millimeter wave imaging system with the phantom;
    varying a size of each section; and
    testing the resolution of the active millimeter wave imaging system with the contrast phantom.

* * * * *